United States Patent
Warner et al.

(10) Patent No.: US 12,147,987 B1
(45) Date of Patent: Nov. 19, 2024

(54) GAMING GATEWAY SYSTEM FOR A SMART PHONE

(71) Applicant: AUTOMATED CASHLESS SYSTEMS, INC., Reno, NV (US)

(72) Inventors: Stephen L. Warner, Zephyr Cove, NV (US); Michael Sackrison, Reno, NV (US); Shawn G. Quick, Reno, NV (US)

(73) Assignee: Automated Cashless Systems, Inc., Reno, NV (US)

( * ) Notice: Subject to any disclaimer, the term of this patent is extended or adjusted under 35 U.S.C. 154(b) by 603 days.

(21) Appl. No.: 17/185,891

(22) Filed: Feb. 25, 2021

Related U.S. Application Data (63) Continuation of application No. 15/212,020, filed on Jul. 15, 2016, now Pat. No. 11,669,815.

(60) Provisional application No. 62/193,586, filed on Jul. 17, 2015.

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *G06Q 20/10* | (2012.01) |
| *G06Q 20/40* | (2012.01) |
| *G06Q 40/02* | (2023.01) |
| *G07F 17/32* | (2006.01) |

(52) U.S. Cl.
CPC ......... *G06Q 20/405* (2013.01); *G06Q 20/108* (2013.01); *G06Q 40/02* (2013.01); *G07F 17/3225* (2013.01)

(58) Field of Classification Search
CPC ... G07F 17/32; G07F 17/3211; G07F 17/3214
USPC .............................. 463/1, 20, 22, 29, 30, 39
See application file for complete search history.

(56) References Cited

U.S. PATENT DOCUMENTS

| | | |
|---|---|---|
| 5,759,103 A | 6/1998 | Freels et al. |
| 6,251,014 B1 | 6/2001 | Stockdale et al. |
| 6,793,134 B2 | 9/2004 | Clark |
| 7,780,526 B2 | 8/2010 | Nguyen et al. |
| 7,844,255 B2 | 11/2010 | Petrov et al. |
| 8,306,879 B2 | 11/2012 | Nonaka |
| 8,452,702 B1 | 5/2013 | O'Donnell et al. |

(Continued)

*Primary Examiner* — Adetokunbo O Torimiro
(74) *Attorney, Agent, or Firm* — Kerr IP Group, LLC (57) ABSTRACT

A gaming gateway system for a smart phone is described. The gateway system includes an embedded controller, a smart phone, a financial gateway, and a gaming regulatory gateway. The embedded controller is communicatively coupled to the networked slot machine and the smart phone. A financial transaction request is received by the smart phone. The financial gateway is communicatively coupled to a financial network and the embedded controller. The gaming regulatory gateway generates the authorization request associated with the financial transaction request for the networked casino slot machine when the financial transaction request is less than a predetermined gaming limit. The gaming regulatory gateway includes a regulatory rules module having a regulatory rule that associates the predetermined gaming limit with a gaming property having the networked casino slot machine. The embedded controller generates an electronic record in response to an approval by the financial network for the financial transaction request.

20 Claims, 6 Drawing Sheets

(56) References Cited

U.S. PATENT DOCUMENTS

| | | | |
|---|---|---|---|
| 8,876,594 | B2 | 11/2014 | Holch et al. |
| 8,977,680 | B2 | 3/2015 | Gibson et al. |
| 9,171,303 | B2 | 10/2015 | Potts et al. |
| 9,830,772 | B2 | 11/2017 | Reaves et al. |
| 2002/0183110 | A1 | 12/2002 | Flanagan-Parks et al. |
| 2003/0073494 | A1 | 4/2003 | Kalpakian et al. |
| 2005/0065876 | A1 | 3/2005 | Kumar |
| 2005/0107155 | A1 | 5/2005 | Potts et al. |
| 2005/0266919 | A1 | 12/2005 | Rowe et al. |
| 2006/0218091 | A1 | 9/2006 | Choy |
| 2007/0282858 | A1 | 12/2007 | Arner et al. |
| 2008/0076506 | A1* | 3/2008 | Nguyen ............... G07F 17/322 463/16 |
| 2008/0153583 | A1 | 6/2008 | Huntley et al. |
| 2009/0099965 | A1 | 4/2009 | Grant, IV |
| 2010/0222132 | A1* | 9/2010 | Sanford ............... G06Q 20/18 463/25 |
| 2011/0086696 | A1 | 4/2011 | MacEwan |
| 2011/0263318 | A1 | 10/2011 | Agarwal et al. |
| 2012/0144461 | A1 | 6/2012 | Rathbun |

* cited by examiner

GAMING GATEWAY SYSTEM FOR A SMART PHONE

CROSS REFERENCE

This patent application is Continuation Application of patent application Ser. No. 15/212,020 filed on Jul. 15, 2016 and entitled FINANCIAL TRANSACTION GATEWAY SYSTEMS AND METHOD, which claims the benefit of provisional patent application 62/193,586 entitled GAMING GATEWAY SYSTEM AND METHOD filed Jul. 17, 2015; and all the patent applications identified above are incorporated by reference in this patent application filing.

FIELD

A gaming gateway system for a smart phone is described. A financial transaction request is received by the smart phone and the gaming regulatory gateway generates the authorization request associated with the financial transaction request for the networked casino slot machine when the financial transaction request is less than a predetermined gaming limit.

BACKGROUND

In everyday retail POS transactions, a merchant uses software that automatically transmits an authorization request to a payment processor (such as a credit or debit card processor) which routes that request to the proper banking network. Because the banks essentially own the cards that the consumer uses, the banks then make a decision based on various factors relating to the transaction, such as amount, location and/or daily limits to make a decision on whether the transaction request is approved or denied. In some cases, even an 'overdraft' is allowed because the bank deems the customer credit-worthy and will approve the transaction even though the customer's account will become overdrawn. Typically, this also results in an overdraft fee charged to the customer.

Most casinos provide automated teller machines (ATM) and cash kiosks for the convenience of their patrons. Currently, Automated Cashless Systems, Inc. (ACS) has extended the reach of ATMs and kiosks to table games and slot machines. More specifically, ACS provides a point-of-sale (POS) personal identification number (PIN) debit fund processing system for gaming patrons at table games and slot machines. The ACS system provides a secure system that allows gaming patrons to initiate and complete an electronic transfer of funds from a bank or credit account entirely at the point of table game play.

In the casino gaming space, there are many additional and varying regulations regarding all matters related to the operation of casinos, and the manufacture of devices used in casinos. These regulations are necessary in order to protect the consumer, the casinos and the reputation of the industry.

With respect to customers, there are the challenges associated with "problem gaming." Problem gaming may be referred to as a psychological condition, impulse disorder or simply an addiction. There are an estimated 1%-2% of those players that gamble that actually have a gambling problem as reported by the "National Center for Responsible Gaming" (NCRG).

Regulations also vary across the country and the world, as there is no federal or international regulation of the casino gaming space outside of online gaming. In the United States, each state is responsible for its own gaming regulations; although many states have similar requirements, there are many differences in what those regulations allow, what devices may be used and how those devices can be used. Further complicating the issue is the concept of the 'sovereign nation' status granted to Native American tribes by the Federal government allowing Native American tribes to regulate their own casinos within each state. This provides a greater number of bodies creating and enforcing casino gaming regulations.

Standard off-the-shelf Point of Sale hardware and software have only been designed to meet banking requirements. For example, the banking industry has not widely supported casino or gaming transactions, whether they take place on a casino property or online. This is due, in part, to the numerous Federal, State, and Tribal regulations with which gaming transactions must comply.

In addition, casinos for many years have allowed ATM machines on site that allow a customer to withdraw funds from his/her credit or debit card account. These machines provide no 'gaming regulatory' inspection or decision-making with regard to obtaining an approval. The machines simply provide cash if the customer's bank approves the transaction.

SUMMARY

A gaming gateway system for a smart phone is described. The gateway system, the gaming gateway system includes an embedded controller, a smart phone, a financial gateway, and a gaming regulatory gateway. The embedded controller is communicatively coupled to the networked slot machine. The smart phone is communicatively coupled to the embedded controller. A financial transaction request is received by the smart phone. The financial gateway is communicatively coupled to a financial network and the embedded controller. The financial gateway receives an authorization request, which is associated with financial transaction request. The gaming regulatory gateway is communicatively coupled to the financial gateway and the embedded controller. The gaming regulatory gateway generates the authorization request associated with the financial transaction request for the networked casino slot machine when the financial transaction request is less than a predetermined gaming limit. The gaming regulatory gateway includes a regulatory rules module that includes a regulatory rule that associates the predetermined gaming limit with a gaming property having the networked casino slot machine. The embedded controller generates an electronic record in response to an approval by the financial network for the financial transaction request.

In one illustrative embodiment, the gaming regulatory gateway includes a property rules module having at least one of a transaction amount limit, a daily transaction limit and a limit imposed by a particular patron. In another embodiment, the gaming regulatory gateway includes at least one of a problem gaming limits rule set, a state rule set, a tribal rule sets, a casino property rule sets, and a federal gaming rule set.

In yet another embodiment, the gaming gateway system includes a problem gaming rule set associated with a problem gaming limits module that includes one or more daily limits. Additionally, the problem gaming rule set associated with the problem gaming limits module further includes a pause period during which a transaction cannot be authorized.

In a further embodiment, a list of transaction type codes is provided by a transaction type rules software module determines the transaction type. The list of transaction type codes includes a gaming code associated with a gaming transaction that corresponds to the networked casino slot machine.

In yet another embodiment, the gaming gateway system may also include a problem gaming rules software module that requires determining that a user initiating the financial transaction request is not excluded from game play on the gaming property.

In a further embodiment, the electronic record is communicated to the smart phone.

FIGURES

The present invention will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims. It is further understood that the steps described with respect to the disclosed process(es) may be performed in any order and are not limited to the order presented herein.

The gaming gateway apparatus, systems and methods presented herein may operate at an illustrative casino gaming device, such as a table game or casino slot machine, and allow a gaming patron to use a financial instrument (credit, debit, prepaid, or other method of transferring money) (payment card) at the illustrative casino table game, slot machine, or other such gaming device.

Additionally, the gaming gateway apparatus, systems and methods enable a gaming service/system provider to provide protections to the regulatory bodies, to the casinos, and to the patron that the financial transactional process is safe and secure, and meets all laws, regulations and rules of Federal, State and/or Tribal entities.

Also, the gaming gateway apparatus, systems and methods provide complete accounting, privacy, verification and can meet all casino and banking regulatory requirements.

Furthermore, the gaming gateway apparatus, systems and methods presented herein allow payment authorization requests to be routed to the banking (or "payment processor") network.

Further still, the gaming gateway apparatus, systems and methods presented herein create a record of all transactions at various properties, as opposed to local databases which just contain transactions for the individual property.

Further still, the gaming gateway apparatus, systems and methods provide the ability to categorize each transaction by type (gaming, retail, etc.) and route them by different merchant ID codes, which allows each transaction to be processed under the correct MCC (merchant classification code). In addition, different rule sets may be applied by on transaction type.

Also, the gaming gateway apparatus, systems and methods have the ability to apply logic rules that are the result of gaming regulations. These rules may be functions of transaction details which include, but are not limited to, amount, transaction frequency, location, property, time of day, type of card or individual.

Additionally, the gaming gateway apparatus, systems and methods presented herein have the ability to apply logic rules that are the result of banking regulations, problem gaming rules, regulatory limits, and the like. These logic rules may be functions of transaction details which include but are not limited to amount, transaction frequency, location, property, time of day, type of card or individual.

Further still, the gaming gateway apparatus, systems and methods have the ability to apply logic rules that are the result of legal/judicial regulations. These logic rules may be functions of transaction details which include but are not limited to amount, transaction frequency, location, property, time of day, type of card or individual.

Further still, the gaming gateway apparatus, systems and methods have the ability to apply business logic rules that result in lower transaction costs. These rules may result in the routing of transactions to different payment processors or may have logic functions that prevent repeated unauthorized transactions.

The systems and methods described herein may therefore satisfy the complex web of transactional, regulatory, and security rules governing requests for funds that take place within casinos. The systems may not operate to circumvent various regulatory rules (e.g., as an ATM machine located within a casino), but may enable rule determination and compliance in real time and at any client device enabled to receive a transaction instrument, such as a credit or debit card.

The systems may thus embody an improvement over existing transaction processing systems, particularly over transaction processing systems configured to process gaming transactions, in that a gateway (e.g., a gaming or master gateway) may enable the aggregation and preprocessing of a variety of transaction and user data, which may satisfy a variety of regulatory and transaction processing requirements at a centralized processing hub. This may, in turn, reduce the complexity of the transaction processing system and improve the processing or preprocessing speed of the system as a whole.

Other advantages include, as described herein, transaction processing at a client device, particularly at the gaming client device within a casino and during game play, real-time protection for individuals associated with a problem gaming status as well as for casinos serving those individuals, transaction fee optimization and real-time payment processor selection, player tracking, and the generation buy-in the gateway.

As described herein, the various features and functions presented above can be performed at various stages of the approval process. The apparatus, systems and methods may be embodied in a gateway database associated with a casino property, in an external gateway, or any combination thereof that performs the functions or features described in this description.

In the illustrative embodiment, the gaming gateway system and method presented herein initiates, processes and completes a gaming point of sale transaction that generates a single or multiple approval (e.g., a dual approval) that guarantees that both banking and gaming regulations are satisfied.

The term "indicia of value" as used herein includes an electronic record, a printed record and a physical token that has a relative worth, i.e. value, to the end user, e.g. customer or patron, and the business or property, e.g. casino. In other words, an electronic record may operate as an indicia of value. Also, a printed record may also operate as an indicia of value.

The indicia of value has a relative worth to the business or property, e.g. casino, and the end user, e.g. patron, in the gaming gateway system and method for a table game that is presented herein.

An "electronic record operating as an indicia of value" is an electronic record that has relative worth to the end user and the business or property. There are a variety of secure communications that communicate an electronic record operating as an indicia of value in the gaming gateway system and method for a table game.

An illustrative electronic record operating as an indicia of value includes the electronic record received from the wireless device, which securely communicates the electronic record to the controller. The controller then proceeds to transmit the electronic record operating as an indicia of value to the payment gateway, which further communicates the electronic record to the financial network or payment processor.

The controller then receives an authorization response from the payment gateway. The authorization response is another electronic record operating as an indicia of value.

The controller proceeds to transmit the authorization response to the wireless device. Again, the transmitted authorization response is an electronic record operating as an indicia of value.

A "receipt" for the approved transaction is presented at the wireless device. A receipt, i.e. payment record, provides a printed record that a payment was received by the business or property, e.g. casino, from the end user, e.g. patron. However, the receipt is not an electronic record and does not have relative worth. In other words, the receipt is a printed record that does not have an indicia of value.

An "electronic record" (by itself) provides electronic or digital evidence that a business activity or transaction took place at a particular time. The electronic record is captured through an electronic or digital process. An electronic record includes a records management solution, which controls the creation, distribution, use, maintenance and disposition of recorded information that is maintained as evidence of business activities or business transactions.

Thus, an electronic record operating as an indicia of value is a subset of an electronic record.

An "electronic record" may include other database attributes that are not specific to the electronic record operating as an indicia of value such as player loyalty information or accumulated loyalty points or player preferences and other such electronic records that do not correspond to an indicia of value.

A "printed record operating as an indicia of value" is a printed record that has relative worth to the end user and the business or property utilizing the gaming gateway system and method presented herein.

In general, a "voucher" is a printed document that has an indicia of value, which may be exchanged for goods, services, casino chips or any other indicia of value.

A "coupon" entitles the holder of the coupon to a discount for a particular product. A coupon is a type of voucher.

As described herein, a "transaction type" may be associated with a particular transaction or a particular request for funds. By way of example and not of limitation, the request for funds may be associated with a gaming transaction type, a retail transaction type, a cash withdrawal transaction type, an online transaction type, and the like. In addition, a particular transaction (associated with a transaction type) may be associated with a particular set of transaction requirements. For instance, a gaming transaction (e.g., a request for funds made at a gaming table within a casino) may be associated with different requirements than a retail transaction (e.g., a transaction associated with a drink purchase). Moreover, a gaming transaction executed at a gaming position or gaming location may be associated with requirements different from those associated with a gaming transaction executed at a non-gaming location or non-gaming position. Thus, different rules or groups of rules may apply to different transactions or different requests for funds based upon the transaction type associated with the transaction as well as the location or position from which the transaction originates. To this end, a particular transaction or request for funds may, in addition, be associated with a transaction origin locator, which may designate a location, position, or origin of the transaction (e.g., such as at a gaming table or within a restaurant).

In gaming, the definition of a voucher is more granular because there are a variety of different vouchers including a complete voucher, a duplicate voucher, an incomplete voucher and replacement voucher. In gaming, a "complete voucher" contains, at a minimum, a complete validation number and is of a quality that can be redeemed through the use of an automated reader or scanner. A "duplicate voucher" is any reprinted complete voucher or incomplete voucher. An "incomplete voucher" contains, at a minimum, the voucher validation number printed across the printed leading edge and is manually redeemable, but is not of a quality that can be redeemed through the use of an automated reader or scanner. A "replacement voucher" is printed following a failed attempt to print a complete or incomplete voucher.

A printed record operating as an indicia of value is different from a complete voucher, a duplicate voucher, an incomplete voucher and replacement voucher; however, the printed record operating as an indicia of value is a type of voucher.

The printed record voucher operates as an indicia of value because it provides a printed record of an "electronic buy-in" transaction that can be tracked by the business or property. In the illustrative table game embodiment, the printed record voucher is printed by the illustrative printer when an "electronic buy-in" transaction is completed; the dealer accesses the printed record voucher operating as an indicia of value and places the printed record voucher in the table game's cash chute.

The printed record voucher operating as an indicia of value is not a cash equivalent. The printed record voucher operating as an indicia of value may not be redeemed through the use of an automated reader or scanner. Additionally, the printed record voucher operating as an indicia of value may not be manually redeemable.

In the illustrative embodiment, a receipt is generated by the wireless printer. The wireless printer receipt is presented to the end user, e.g. customer or patron. The customer (not the property) is responsible for the receipt. The printed record voucher operating as an indicia of value is distinguishable from the customer receipt because the printed record voucher provides a record of the transaction initiated by the end user, in which the end user received the casino chips, i.e. a physical token operating as an indicia of value, after providing the appropriate "card" information, e.g. PIN.

An illustrative voucher system includes, but is not limited to, a Ticket In Ticket Out (TITO) system. A TITO ticket is an illustrative complete voucher that can be redeemed through the use of automated reader or scanner.

A "physical token operating as an indicia of value" is a physical token that has relative worth to the end user and the business or property. By way of example and not of limitation, casino chips, poker chips and gift cards are illustrative physical tokens operating as an indicia of value.

A "financial gateway" is also referred to interchangeably as the "banking gateway," or the "payment processor gateway." The financial gateway is configured to communicate with at least one financial network or payment processor. Additionally, the payment gateway is configured to receive an authorization request, which is associated with an approved transaction.

A "gaming gateway" may be configured to manage and perform a plurality of transaction processing steps prior to submission of a transaction request to the financial gateway. The gaming gateway may, for example, be configured to manage and perform the regulatory requirements associated with gaming or gambling. By way of example and not of limitation, the gaming gateway may include problem gaming limits and problem gaming rule sets. Illustrative problem gaming rule sets may include daily limits or may pause the period during which a person may withdraw funds to allow for a "cool down" period. Additionally, the gaming gateway may be configured to communicate with a regulatory gateway (or regulatory rules module, as described herein) that includes a variety of rule sets such as tribal rules, state gambling rules, federal gaming rules, casino property gaming rules and other such gaming or "gambling" rule sets. Gaming is used to refer to gambling A "master gateway" may perform the operations of the financial gateway and/or the gaming gateway. The master gateway may be communicatively coupled to a relational database management system.

An "aggregator" refers to a server, database or combination thereof that stores the transactional information. Additionally, the aggregator may be communicatively coupled to one of the financial gateway, gaming gateway, master gateway or any combination thereof and, therefore, the aggregator may also store the gaming gateway rule sets and related gaming information. In various embodiments, an aggregator may be embodied in any of the gateways described herein.

The aggregator may be controlled or accessible by a single entity or variety of different entities. For example, any of the gateways described above, including the "master gateway," may include a database and thus may operate as an aggregator, which is accessed during each transaction performed by the embedded controller. Alternatively, the gaming gateway may include a gaming aggregator that may be accessed by the master gateway, a casino property, a regulatory body, or any combination thereof. In various embodiments, one or more reports may be generated based upon the aggregated data. Reports may include, for example, audit and accounting information, which may be accessible by one or more casino properties, regulatory entities, various government agencies, and the like.

Figure 1:
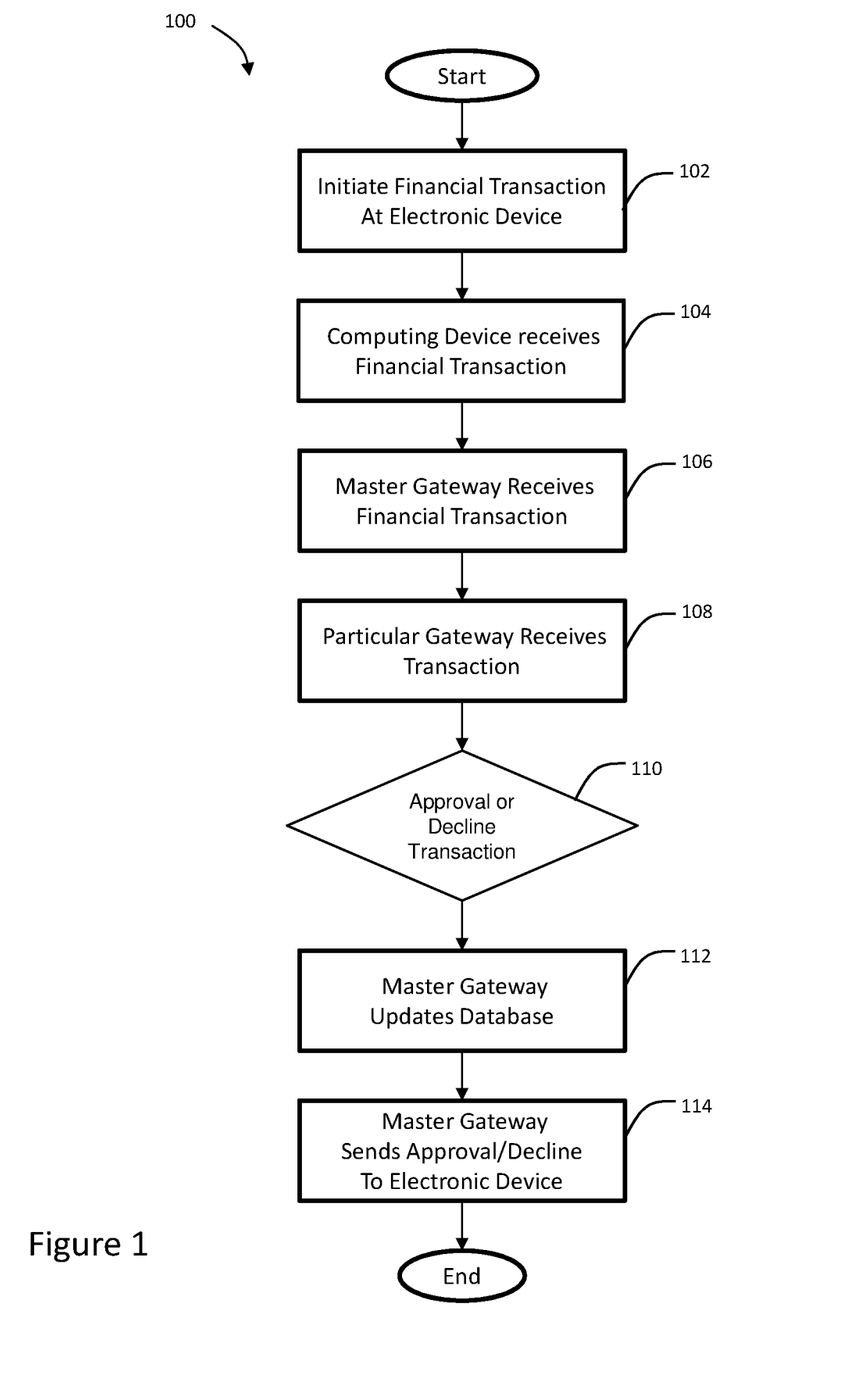
FIG. 1 shows an illustrative flowchart of the various operations performed by a master gateway that includes a gaming gateway.

Referring to FIG. 1, there is shown a flowchart of the various operations performed by an illustrative master gateway. The method 100 is initiated at block 102 where a transaction is generated by use of equipment designed to accept payment cards by way of mag-stripe, EMV, NFC or other electronic means. The transaction includes such details as account number, cardholder information, amount of transaction (inclusive of any charged fees), and a verification/identification number. In various embodiments, one or more approval gateways, as described herein, may provide PCI compliance, which may eliminate the necessity of the performance of PCI compliance rules by other (multiple) entities, such as one or more banking gateways or payment processors.

The method then proceeds to block 104 where the transaction information is routed through one or more computing devices that log transaction details into a database via electronic networks and also forward the transaction details along to one or more 'approval' gateways.

At block 106, the transaction information is communicated to a master gateway that is communicatively coupled to one or more "Approval" gateways that include, but are not limited to, the banking gateway, and one or more 'gaming gateways', that each handle the transaction in serial or parallel. Each gateway is responsible for assessing the transaction, applying business rules and requirements, and providing an 'authorize' or 'decline' result back to one or more of the computing devices that issued the transaction, which may also be referred to as an 'aggregator.'

The appropriate gateway receives the transactional information at 108 and processes the transactional information according to the logic or rule set corresponding to the particular gateway. More specifically, each gateway, may, in turn, route the request to additional gateways for additional approval requirement processing. For example, a gateway that is responsible for reducing fees charged to process a transaction may look at card information and/or amount information and route the transaction to a specific banking gateway that will charge less based on amount and/or card type.

At decision diamond 110, a determination is made whether the particular gateway has algorithmically determined an approval or denial, either by a gateway's logic or other communicatively coupled gateway that it used in processing the transaction, it returns the decision back to the device that requested the decision.

The results from decision diamond 110 are then communicated back to the master gateway. The master gateway aggregates the results from each of the particular gateways.

At block 112, the master gateway updates the appropriate database with all necessary information about the transaction. The master gateway also provides a final approval to the original requestor of the transaction. Additionally, the master gateway may also communicate that the transaction has been declined. A final 'approval' would require unanimous approvals from all upstream gateways and aggregators, unless additional business logic provides for a lesser amount.

At block 114, the electronic client device that initiated the transaction communicates that the transaction has been approved or denied. For example, the original transaction generating computing client device would then a) in the case of an approval, issue funds and or indicia of credit to the player, along with a receipt, or b) in the case of a denial, providing the patron with a message stating declined and optionally, a reason or reason code.

The system architecture that supports the operations performed by the illustrative master gateway and the other specialized gateways may operate on individual computing devices or distributed across multiple computing systems via electronic communication.

The illustrative gateways and aggregators can be located anywhere in the data path from the patron interface all the way back to the banking network. They also can be local to the casino, or external to the casino.

Depending on the particular embodiment, each gateway or aggregator will optionally update a database with transaction information in internal or external databases which provide accounting, validation, verification and auditing ability. At least one gateway and/or aggregator will record all information in a database external to casino, and identify those transactions by originating location and/or property.

In one illustrative embodiment, a transaction may also be optionally coded with an ID that identifies the source of the transaction and/or what product or service is requested. This allows gateways to apply different business rules based on the type of transaction. For example, a casino patron may wish to order a drink from the gaming device, and this transaction would be coded differently than a request for credits on the gaming device used for wagering. In the former case, gaming related business rules may be omitted, but retail business rules may be applied.

Business rules applied to gaming transactions may be, but are not limited to, amount of transaction, fees applied, type of payment card, date and time, frequency of use or "velocity" (e.g., the same customer may only withdraw funds every 15 minutes), player identification, total amount withdrawn over a period of time, cost of transaction, location of originating device, casino minimums and maximums, regulatory minimums and maximums (i.e., per transaction, per day, per device, per payment card, per individual)

The illustrative gateways or aggregators may be communicatively coupled to a financial terminal that is disposed in or near a slot machine or a casino table game. By way of example and not of limitation, the casino table game includes card games such as Blackjack (also known as "21"), Poker, Pai Gow, Baccarat, and other such card games. Additional illustrative table games include, but are not limited to, wheel games such as roulette and dice games such as craps, Sic Bo and other such dice games.

In the illustrative embodiment, the gaming gateway system and method does not dispense cash, like a typical Automated Teller Machine (ATM). In another embodiment, the gaming gateway system and method dispenses other indicia of value, e.g. loyalty points or gift cards.

The gaming gateway system and method may be easily relocated, for example, to a patron's point-of-play, thereby facilitating game play. Additionally, the gaming gateway system and method eliminates the need to restock an unattended machine with cash. Furthermore, the gaming gateway system and method operates with fewer complex mechanical components.

Figure 2:
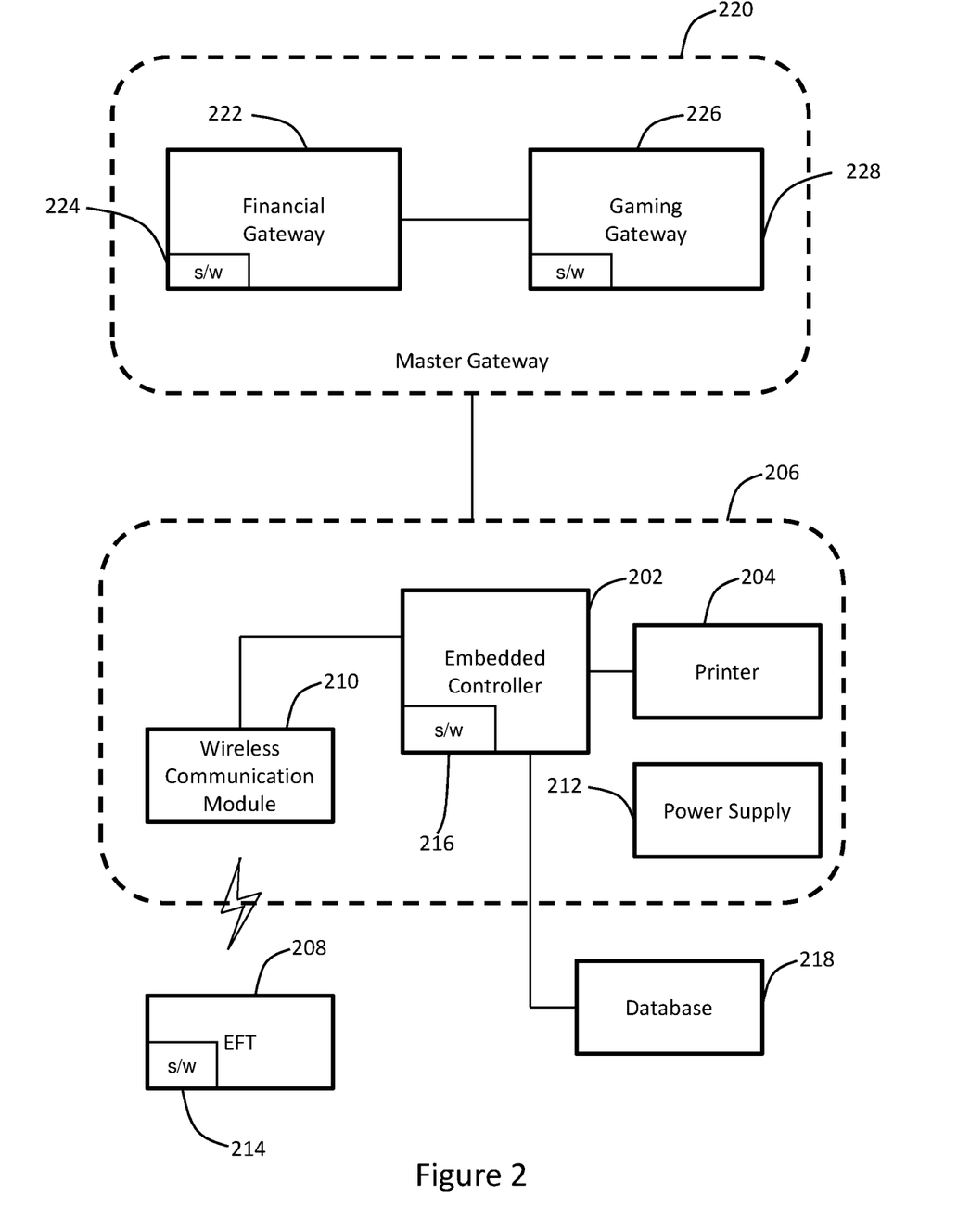
FIG. 2 shows a gaming gateway system that includes an embedded controller disposed on a casino table game or casino slot machine.

Referring to FIG. 2 there is shown an illustrative gaming gateway system 200 that includes an embedded controller disposed on a casino table game or casino slot machine. The gaming gateway system 200 includes a controller that is communicatively coupled to a printer. By way of example and not of limitation, a hard wire connection is made between an embedded controller 202 and a dedicated printer 204, which generates a printed record operating as an indicia of value.

By way of example and not of limitation, the embedded controller 202 may be embodied as an ARM based Linux embedded controller with USB and Ethernet connectivity to the printer 204. The illustrative printer 204 may be an Ithaca 950 printer that has a hardwire connection to the embedded controller 202. Alternatively, the printer has a secure wireless connection to the embedded controller 202. More specifically, the embedded controller 202 may be communicatively coupled to the printer 204 using a secure wireless communication channel that operates using a wireless communication protocol such as Wi-Fi, Bluetooth, Zigbee, or other such wireless communication protocol.

In the illustrative embodiment, the embedded controller 202 includes a logic component, such as a central processing unit ("CPU" or "processor"), a graphics processor or graphics processing unit ("GPU"), a field programmable gate array ("FPGA"), and the like. The controller 202 further includes at least one static or random access memories, at least one port that permits connection of one or more external memories or data storage devices. For illustrative purposes, the CPU may include an ARM-based microprocessor, RISC microprocessor, or other such microprocessor suitable for the intended purpose.

The illustrative embedded controller 202 comprises one or more local device and network connectivity modules for communication using wired, wireless, near-field communications (NFC), other electromagnetic, fiber optic, other optical, or other communication means and/or protocols, including but not limited to USB (X).(Y), the proprietary Standard Peripheral Communication ("SPC") protocol used in certain gaming devices, RS-232, RS-422, RS-485, IEEE 1394, wired Ethernet, Wi-Fi, 802.1(x)(y) compliant methods, Bluetooth™, infrared, optical, radio frequency, CDMA, GSM, GPRS, satellite, and the like. The network communication modules may include one or more ports enabled and associated with the network communication modules. The embedded controller may be configured to provide multiple ports that are simultaneously active using different protocols, multiple instances of the same protocol, or any combination thereof.

The illustrative embedded controller 202 operates under the control of an operating system such as, but not limited to, one based on the open-source Linux kernel with appropriate device drivers and other software necessary to securely implement transactional functionality presented herein. More generally, the embedded controller 202 may operate with any other suitable operating system based on open-source or proprietary software or firmware.

In the illustrative embodiment, a printer box 206 houses the embedded controller 202, a wireless communication module 210, the printer 204 and the power supply 212. In the illustrative embodiment, the printer box 206 is disposed below an illustrative table game 220. The illustrative printer box 206 provides a single semi-portable enclosure.

The embedded controller 202 is also communicatively coupled to a wireless device. In the illustrative embodiment, the wireless device is an Electronic Funds Transfer (EFT) terminal 208 that uses a wireless connection such as an IEEE 802.11 (WiFi), IEEE 802.15 (Bluetooth/Zigbee) or other such wireless communication standard. The process of generating a secure communication between the embedded controller 202 and the EFT terminal 208 is performed by an EFT software module 214 communicating with an embedded controller software module 216. In the illustrative embodiment, the EFT software module 214 is configured to present the illustrative end user, e.g. casino patron, with user instructions.

More specifically, the illustrative EFT terminal 208 is a Blue Bamboo P200, which includes a PCI certified receipt printer, a PIN pad, an NFC contactless solution, an LCD display, an EMV card reader and a mag stripe card reader. The EMV card reader is compatible with the EMV global standard for authentication of credit and debit card transactions. The EFT terminal 208 may also include a payment card industry (PCI) and pin entry device (PED) certified device.

The Blue Bamboo P200 or other such compatible device includes proprietary software 214 that may be embodied as a STIPlet that conforms to the Global Platform Small Terminal Interoperability Platform (STIP) standard. The pre-encrypted data sent between the STIPlet or comparable application running on the EFT terminal 208 and the custom proprietary software application 216 running on the embedded controller may be encoded using a proprietary format. Even if the encryption of the data is broken, the plaintext format of the data will still be unknown. Alternative devices are configured to provide similar functionality as the STIPlet with a combination of firmware and software that operates on a device configured to perform the functions presented herein.

The wireless device, EFT terminal 208, includes a hardware module (not shown) that supports secure wireless communication using wireless communication protocols such as Bluetooth, Zigbee, Wi-Fi and other such wireless communication protocols. Additionally, the embedded controller 202 is communicatively coupled to a wireless communication module 210, which is also configured to support secure wireless communication using wireless communication protocols such as Bluetooth, Zigbee, WiFi and other such wireless communication protocols.

More generally, the wireless device 208 may comprise a central processing unit ("CPU"), one or more static or random access memories, and one or more ports to permit connection of one or more external memory or data storage devices. The wireless device may further include a point-of-sale (POS) personal identification number (PIN) entry keypad and one or more displays or display devices. The wireless device may include a payment card reader that may be a smart card reader, a magnetic card reader, a high-capacity optical storage media reader, a bar code, QR code, or other optical data storage reader, a punch card reader, a Braille reader, a contactless card reader, a proximity mobile payments reader that enables communication with smart phone devices, a contactless proximity card reader that processes secure smart ticketing and electronic payments using contactless secure mobile commerce technology, or any other device or system which retrieves information stored on or in a payment card or its functional equivalent. The wireless device may include one or more network connectivity modules for communication using wired, wireless, near-field communications (NFC), other electromagnetic, fiber optic, other optical, or other communication means and/or protocols, including but not limited to Wi-Fi, 802.1(x)(y) compliant methods, Bluetooth™, infrared, optical, radio frequency, CDMA, GSM, GPRS, and satellite.

The network communication modules may include one or more ports enabled and associated with the network communication modules. Network connectivity may be achieved by the wireless device via any one or combination of several communication modules and communication modes based on operational situations.

For example, the wireless device may communicate via a wired network using the appropriate wired communication module while the wireless device is placed in a wired connectivity cradle equipped with access to a wired network and the appropriate connector(s) to operatively communicate with a wired communication module port. When the wireless device is removed from the wired connectivity cradle, the wireless device may be switched from a wired communication mode to a wireless communication mode via activation and deactivation of the appropriate communication modules.

The switch from wired to wireless communication mode may be performed automatically by software or firmware running on the wireless device or performed manually at the direction of a user. Similarly, the wireless device may automatically select or be manually instructed to utilize one of several available communication modules and modes to use based on operational factors such as, but not limited to, availability of service, signal strength, security considerations, available bandwidth, link reliability, and the like by activating desired communication module(s) and deactivating others.

The wired connectivity cradle may also comprise a wireless access port operatively connected to the wired network and accessible by a wireless communication module in one or more wireless devices, thereby providing a localized point of network access for one or more wireless devices in a gaming environment within which the electromagnetic spectrum may be highly congested and radio frequency interference is prevalent. The wireless device may comprise a printer and/or a printer port for connection of an external printer or a plurality of printers connected to a plurality of gaming devices via wired, wireless, or other communication means.

The wireless device may be powered by alternating current, direct current, battery, stored charge, solar or any other known power source available at the point of use. Wireless devices powered by stored energy sources may be periodically recharged from other power sources, including but not limited to charging a stored energy source when the wireless device is placed in a special cradle that may provide wired network connectivity as described above in addition to power charging capability.

In the illustrative embodiment, the embedded controller 202 does not perform payment functions; rather, the payment functions are initiated by the EFT terminal 208. The embedded controller 202 securely transmits the requests from the EFT terminal 208. Since the embedded controller does not perform the payment function of generating the EFT request, there is little or no risk of a security breach resulting from the embedded controller 202 initiating a payment transaction. Thus, the wireless device, e.g. embedded controller 202, securely communicates a plurality of transactional data to the controller, wherein the transactional data corresponds to the transaction initiated by the wireless device.

The embedded controller 202 is communicatively coupled to a database 218. By way of example and not of limitations, the illustrative database 218 is a mySQL relational database that is communicatively coupled to a web server. Authorized users may access the SQL database resident on the database server via HTTPS or other secure connection using conventional computing hardware via the web server.

The embedded controller 202 is also communicatively coupled to a "master gateway" 220. The master gateway includes a financial gateway 222 and corresponding software module 224. Additionally, the master gateway 220 also includes a gaming module 226 that includes a related software module 228.

By way of example and not of limitation, the embedded controller 202 is communicatively coupled to the master gateway 220 using a wired Ethernet (TCP/IP) that employs an illustrative security protocol such as HTTPS utilizing SSL/TLS. Other security protocols may also be used. The HTTPS protocol provides authentication and protects the privacy and integrity of the exchanged data.

The financial gateway 222 is configured to communicate with at least one financial network. Additionally, the financial gateway 222 is configured to receive an authorization request, which is associated with an approved transaction. The financial gateway module 224 resides in the financial gateway 222 and includes proprietary software that communicates with the embedded controller 202.

In the illustrative embodiment, the embedded controller 202 is communicatively coupled to a financial gateway API using a secure network communication protocol. The financial gateway 222 is communicatively coupled to one or more financial networks, including but not limited to the PLUS, STAR, CIRRUS, INTERLINK, MONEY PASS, or NYCE networks, that provide access to the server(s) associated with patrons' financial accounts.

In operation, the embedded controller 202 connects to and exchanges data with the financial gateway 222. The transaction is initiated with an outbound EFT request, which is associated with a patron interacting with the wireless EFT terminal 208. Applicable data is forwarded from the wireless terminal 208 to the embedded controller 202, which is then sent to the financial gateway 222 and then to the appropriate financial network associated with the institution or other entity that manages and controls the patron's account. The result of the processed EFT request from the institution or entity is conveyed back to the financial gateway 222 via the financial network and then back to the embedded controller 202 for further disposition. The financial gateway 222 also has the ability to apply business based logic rules to initiated transactions. These parameters will determine the optimal transaction routing through the payment networks and can also determine whether or not to deny transactions based on pre-determined criteria.

The master gateway 220 may also include a gaming gateway 226, which acts as a gaming regulatory gateway and adheres to limits, rules and standards that are set forth in accordance with specific gaming jurisdictions. The gaming gateway 226 manages rules and limits for different jurisdictions. The gaming gateway 226 makes initial determinations based on these limits, rules and standards about whether a transaction should be processed and sent on to the financial network or rejected without being sent.

Figure 3:
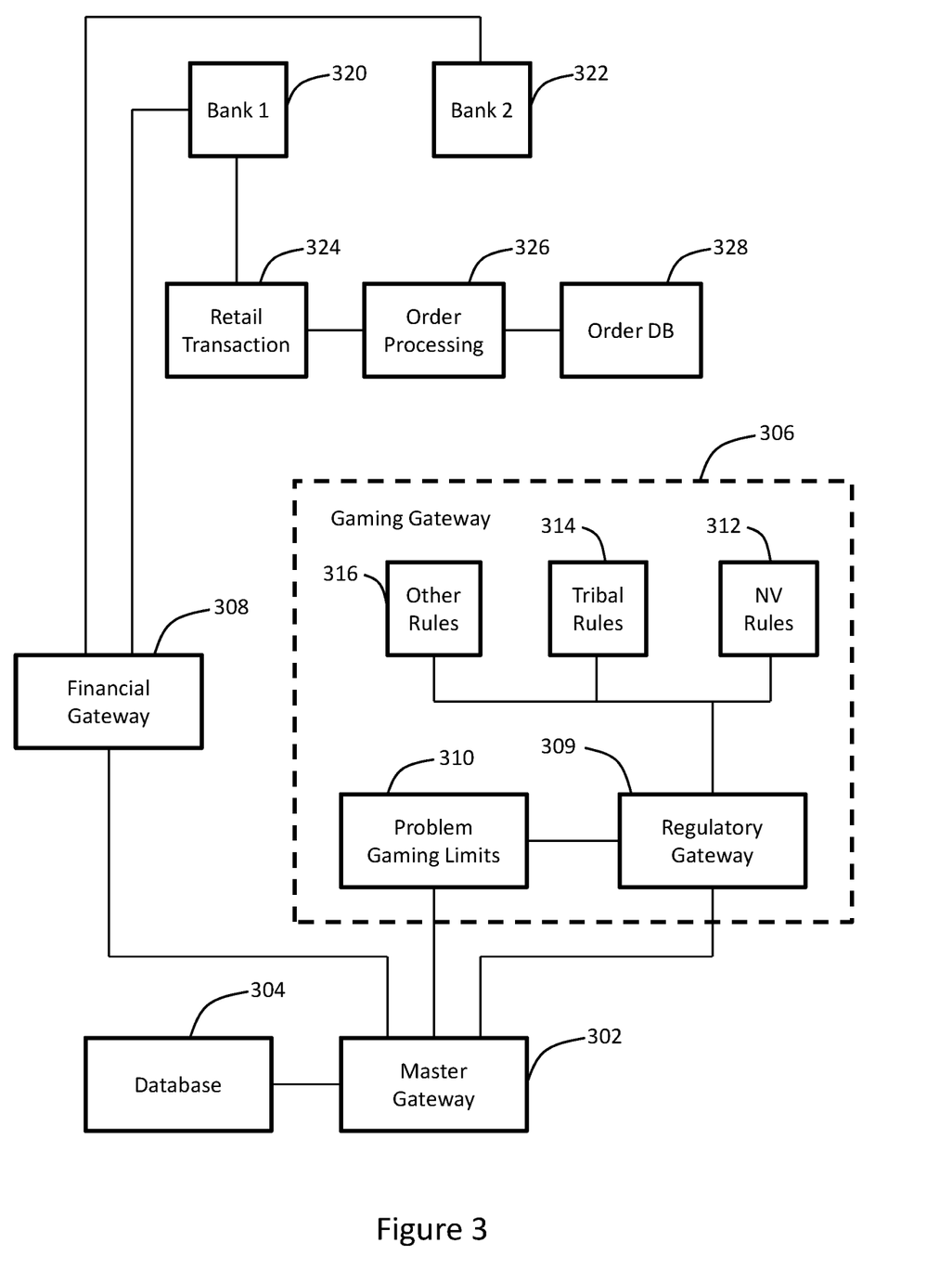
FIG. 3 shows another illustrative embodiment of the master gateway operating as an aggregator.

Referring to FIG. 3, there is shown another illustrative embodiment of the master gateway operating as an aggregator. The illustrative master gateway 302 is communicatively coupled to a database 304. Additionally, the master gateway 302 is communicatively coupled to gaming gateway 306 and financial gateway 308.

In one illustrative embodiment, the relational database management system 304 enables the master gateway 302 to operate as an aggregator of the gaming gateway rules sets and the transactional information communicated to the financial gateway 308.

The gaming gateway 306 manages and performs the regulatory requirements associated with gaming. By way of example and not of limitation, the gaming gateway 306 may be communicatively coupled to a regulatory gateway 309 and a problem gaming limits module 310. The illustrative regulatory gateway 309 includes state rule sets 312, tribal rule sets 314 and other rule sets 316 such as casino property rules, federal gaming rules and other such gaming rules.

Illustrative problem gaming rule sets embodied in the problem gaming limits module 310 may include daily limits or may pause the period during which a person may withdraw funds to allow for a "cool down" period.

The master gateway may also be configured to communicate with the financial gateway 308, which is communicatively coupled to at least one financial network or payment processor. The financial gateway 308 is configured to receive an authorization request, which is associated with an approved transaction.

In the illustrative embodiment, the financial gateway 308 is communicatively coupled to a bank 320 and bank 322. The illustrative bank 320 is also configured to perform retail transactions, not just gaming transactions. The illustrative bank 320 is configured to communicate with a retail transaction module 324, which is operatively coupled to an order processing module 326 that stores the transactional date in the order database 328.

Figure 4:
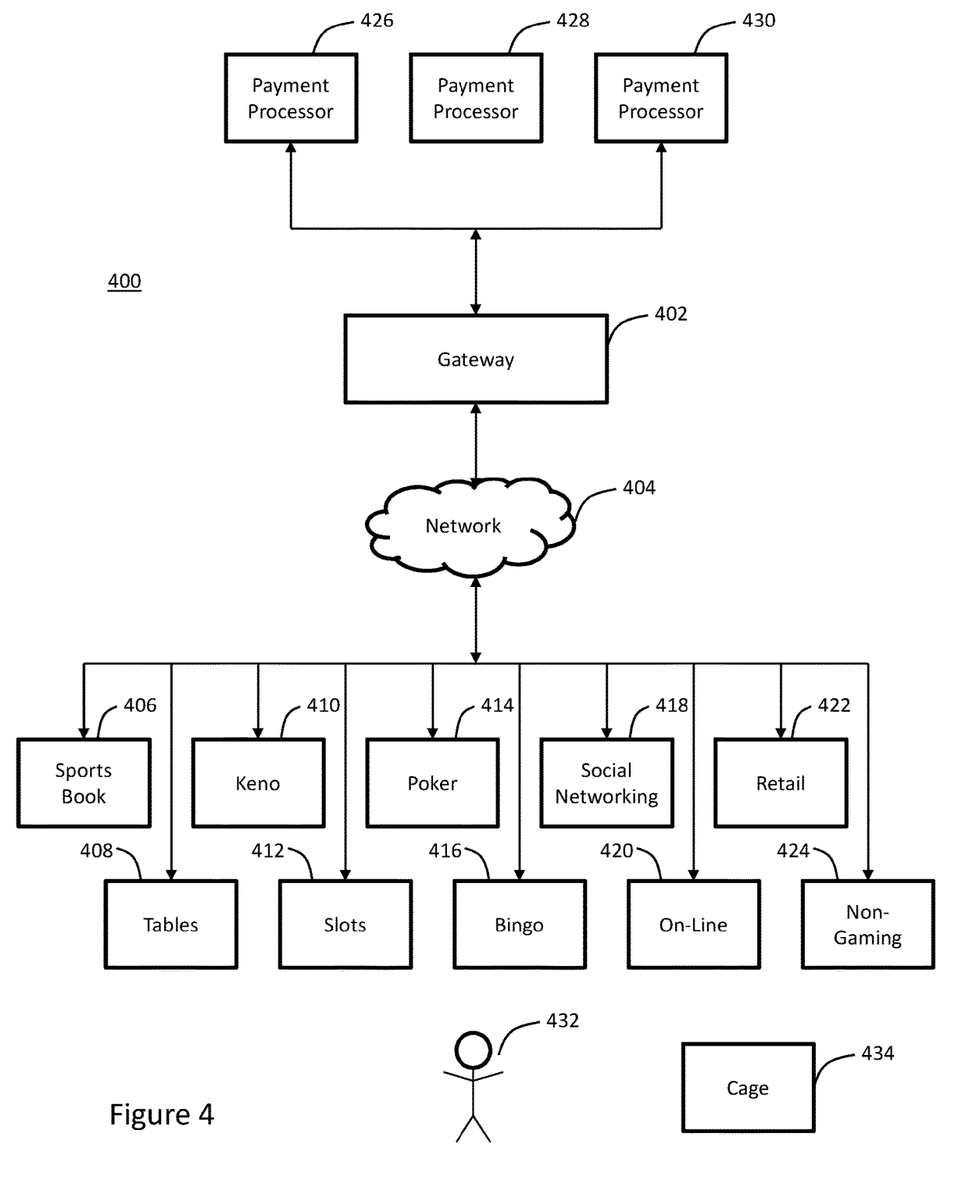
FIG. 4 shows another illustrative embodiment of the master gateway coupled to a plurality of payment processors and a plurality of client devices through a network.

Referring to FIG. 4, there is shown an illustrative embodiment of a transaction processing system 400. The transaction processing system 400 may include the master gateway, the gaming gateway, and/or the financial gateway and may, in addition, perform the functions described herein with respect to any of the gateway systems.

To this end, the transaction processing system 400 may comprise a master gateway 402 (substantially similar or identical to the master gateway 220), a network 404, and one or more client devices, such as client devices 406, 408, 410, 412, 414, 416, 418, 420, 422, and 424. The transaction processing system 400 may, in addition, comprise one or more payment processors, such as payment processors 426, 428, and 430. A user 432 may interact with the transaction processing system 400 to redeem or exchange a printed record operating as an indicia of value (received from the system 400 and printed at an EFT device as described herein) at a casino "cage" 434 (which may include a chip bank, a plurality of cashiers, and a main bank).

As described above, the master gateway 402 may comprise a system configured to receive and process transaction data. In this respect, the master gateway 402 may function as a transaction data aggregator, and may comprise one or more logic components (such as one or more controllers or processors) communicatively coupled to one or more tangible, non-transitory, computer-readable media. The logic components may execute instructions stored on the computer-readable media to perform the transaction processing and aggregation operations described herein.

The master gateway 402 may be communicatively coupled, by way of the network 404, to the one or more electronic client devices 406, 408, 410, 412, 414, 416, 418, 420, 422, and 424. The master gateway 402 may be further communicatively coupled, by way of the network 404, to the one or more payment processors 426, 428, and 430.

Each of the electronic client devices 406-424 may comprise any device configured to receive transaction data. The transaction data may be submitted (as part of a request for funds) by a user or purchaser such as the user 432.

The client devices 406-424 may therefore comprise EFT devices (as described above). By way of example and not of limitation, the client devices 406-424 may be situated or physically disposed in a casino gaming environment, in a retail environment, in an online purchasing or online shopping environment, and the like.

For example, the client device 406 may be disposed in a sports book, the client device 408 may be disposed at a gaming table, the client device 410 may be disposed at a device for playing keno, the client device 412 may be disposed in a slot machine, the client device 414 may be disposed at a poker table or device for playing poker, and the client device 416 may be disposed at a bingo table or device for playing bingo. Similarly, the client device 418 may be disposed as part of a social networking system, such as a personal or tablet computing device or smartphone, and the client device 420 may be implement as part of an online purchasing system and may comprise, for example, a tablet computing device, a personal computer, or a smartphone. Further still, the client device 422 may be disposed in a retail environment and may comprise a register or a tablet or other retail computing device. The client device 424 (as well as a variety of other client devices) may be further disposed in any other suitable environment, such as a gaming or non-gaming environment.

The payment processors 426, 428, and 430 may, as described above, comprise any payment processor (or banking) systems configured to process one or more transactions. For example, the payment processors 426, 428, and 430 may comprise systems owned and operated by one or more financial institutions for the receipt and processing of requests for funds (e.g., transactions) against debit and credit accounts.

Figure 5:
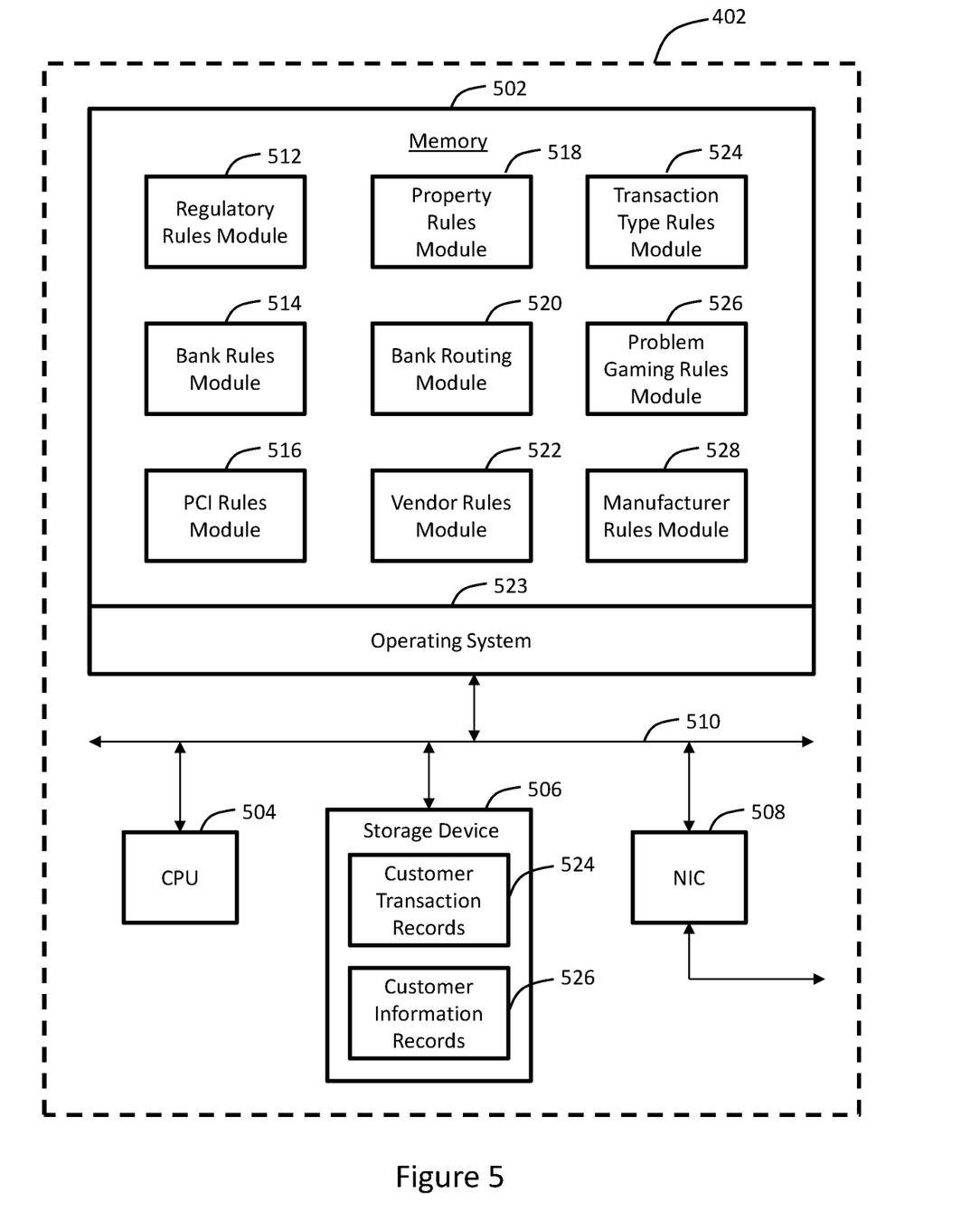
FIG. 5 shows another illustrative embodiment of the master gateway operating as a financial transaction preprocessor and aggregator.

Referring now to FIG. 5, there is shown an illustrative master gateway 402. The master gateway 402 may comprise a memory 502, a logic component 504 (such as a controller or processor, a plurality of controllers or processors, a graphics processing unit or units, an FPGA or FPGAs, and the like), a database 506, and a network interface card (or NIC) 508. The master gateway 402 may further comprise a communications bus 510, which may communicatively couple the memory 502, the logic component 504, the database 506, and the NIC 508. The communications bus 510 may further enable communications between the master gateway 402 and a variety of external systems, such as between the master gateway and devices or systems on the network 404.

The memory 502 may comprise any suitable tangible, non-transitory computer-readable medium configured to store one or more software modules for execution by the logic component 504. The logic component 504 may therefore communicate, via the bus 510, with the memory 502 to retrieve instructions for the execution of one or more software modules stored in the memory 502.

In various embodiments, one or more of the software modules may be stored in a memory that is external to the master gateway 402, in a memory that is internal to the master gateway, or a combination of memories, some internal and some external. In addition, as module rules change or are adopted, changing the rules at the a gateway (such as the master gateway) may affect all client devices immediately. Implementation across all client devices based upon a rule change at the master gateway may result in a time and cost savings over having to upgrade thousands of devices over a period of many days or weeks, and may be immediately implemented across an entire jurisdiction or geographical area (e.g., over an entire country).

By way of example and not of limitation, the memory 502 may store a regulatory rules software module 512, a bank rules software module 514, a PCI rules software module 516, a property rules software module 518, a bank routing software module 520, a vendor rules software module 522, a transaction type rules software module 524, a problem gaming rules software module 526, and a manufacturer rules software module 528.

The regulatory rules software module 512 may include a plurality of regulatory rules associated with one or more casino gaming jurisdictions. For example, the regulatory rules software module 512 may specify federal, state, and tribal rules in association with each of a plurality of gaming jurisdictions. These rules may place limitations on transactions occurring within casino gaming establishments and may vary by jurisdiction.

The bank rules software module 514 may include a plurality of bank rules associated with one or more payment processors. For instance, the bank rules software module 514 may specify transaction fees imposed by a plurality of payment processors with which the master gateway 402 is capable of communicating and from which the user 432 may request funds.

The PCI ("Payment Card Industry") rules software module 516 may include a plurality of security rules for the processing of credit and debit transactions electronically. For example, the PCI rules software module 516 may include rules associated with the PCI Data Security Standard, which may comprise a set of requirements designed to ensure that companies that process, store, or transmit credit or debit card information maintain a secure environment and process those transactions securely. PCI rules may also modify certain financial request data fields to tokenize private information so that it may be stored safely by the master gateway. This modification may include encryption, addition of hash fields or other means to protect the information from unauthorized access and usage.

The property rules software module 518 may include a plurality of rules associated with a casino gaming property. For example, the property rules software module 518 may specify transaction amount limits, daily transaction limits, limits imposed on particular patrons (such as limits imposed on frequent casino patrons or patrons holding markers with the casino property), and the like.

The bank routing software module 520 may include a plurality of rules for routing a request for funds to a particular payment processor. For example, the bank routing software module 520 may specify that particular request for funds should be routed to a particular payment processor based upon a lowest transaction fee. The bank routing software module 520 may also specify that a particular request for funds should be routed to a secondary payment processor in the event that an initially selected payment processor declines the request for funds or is otherwise unavailable to process the transaction.

The vendor rules software module 522 may include a plurality of rules associated with the client device vendor. For instance, where the client device is associated with a casino game, the vendor rules software module 522 may include rules that are particular to the game or client device associated with the game.

The transaction type rules software module 524 may include a plurality of rules for determining a transaction type associated with a request for funds. For example, a request for funds may be associated with a transaction type code.

The transaction type code may specify a transaction type, and the transaction type rules software module 524 may be used to determine, based upon the code, the transaction type associated with the request for funds. By way of example and not of limitation, the request for funds may be associated with a gaming transaction type, a retail transaction type, a cash withdrawal transaction type, an online transaction type, and the like.

The problem gaming rules software module 526 may include a plurality of rules for determining whether a request for funds has been made by a user 432 associated with a problem gaming status or with a user 432 who has been identified as an individual not permitted to participate in a casino game or who has otherwise applied a status of "self-excluded," meaning that the individual has requested that the gaming establishment deny requests for funds made by the individual within the gaming establishment, such that the individual is prohibited or prevented from making requests for funds in connection with gaming activities on the property.

The manufacturer rules software module 528 may include a plurality of rules associated with a client device manufacturer. For instance, where a client device 406-424 is associated with a casino gaming, such as a slot machine work table game, the manufacturer rules software module 528 may include rules that are particular to the game or client device associated with the game.

The memory 502 may further include an operating system or operating system software module 522. The operating system 523 may comprise the operating system or operating system software for the master gateway 402. As such, the logic component 504 may execute the operating system 523 to perform the operations and functions, as described herein, associated with the master gateway 402.

The database 506 may comprise a tangible, non-transitory, storage medium. The database 506 may further comprise any suitable database structure for storing the plurality of data records. For example, the database 506 may comprise a relational database structure configured to store transaction and user data records. By way of example and not of limitation, the database 506 may include a user transaction records table 524 and a user information records table 526. The user transaction records table 524 may include transaction data associated with a plurality of users. The user information records table may include other data associated with the plurality of users such as, for example, user profile data, user demographic data, user credit history data, user gaming history data, and the like.

The logic component 504 may communicate, via the bus 510, with the database 506 to retrieve and store user transaction data information and user information for a variety of purposes, such as, for example, player tracking, funds requests processing, and the like.

The NIC 508 may permit the master gateway 402 to communicate with a plurality of other devices or systems via the network 404. The NIC 508 may further permit the master gateway 402 to receive transaction and other data from sources external to the master gateway 402. The NIC 508 may utilize well known networking protocols to communicate with the other networked devices. These protocols may include Ethernet type protocol, TCP/IP protocols, and other such protocols.

Figure 6:
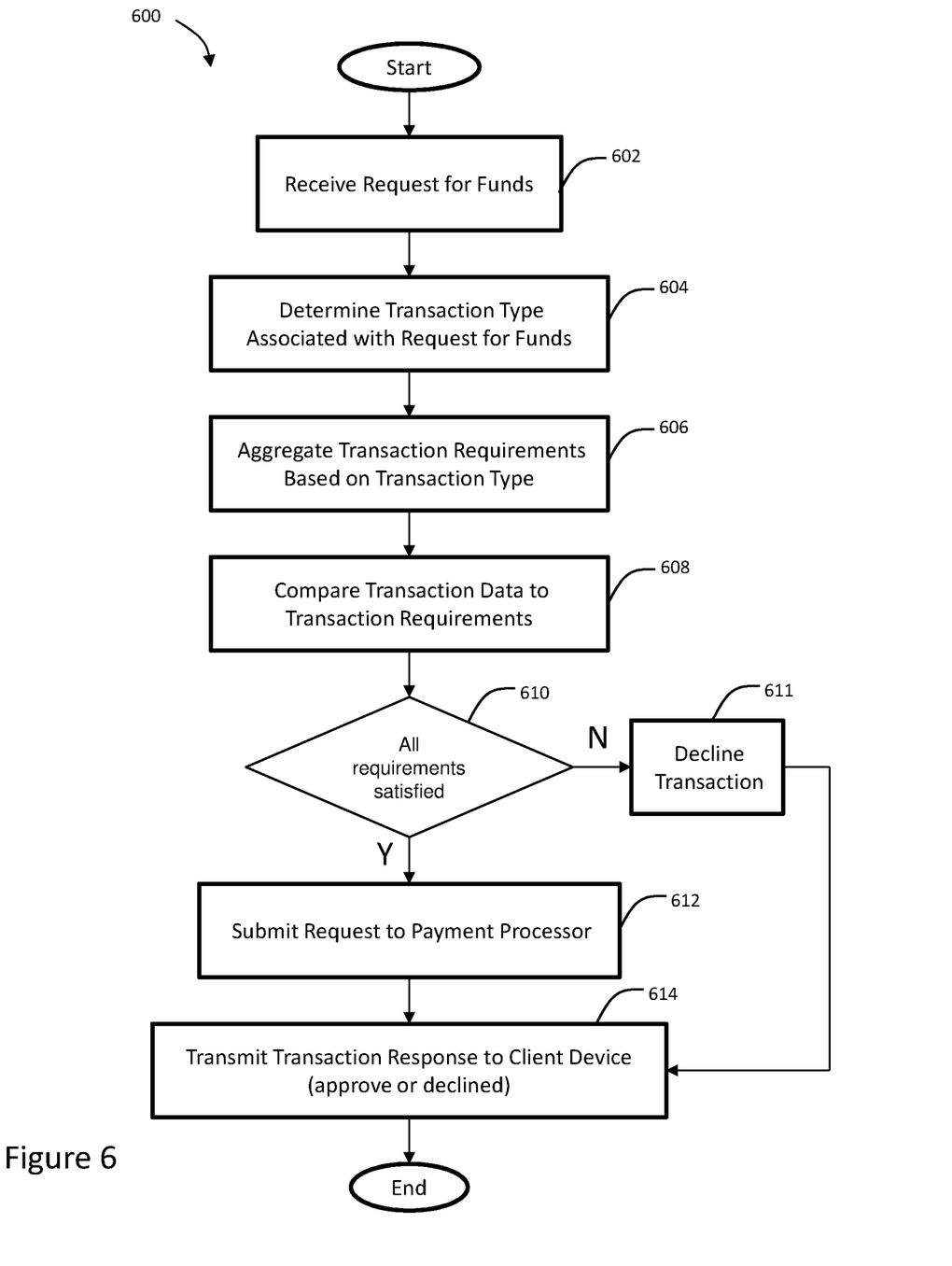
FIG. 6 shows another illustrative flowchart of the various operations performed by a master gateway.

In operation, and with reference to FIG. 6, a flowchart 600 associated with a process for processing a transaction is shown. Accordingly, at block 602, the master gateway 402 may receive a request for funds. The request for funds may be provided by the user 432 of a client device 406-424. For instance, the user 432 may interface with one of the client devices 406-424 in a casino gaming property to request funds during game play. More particularly, the user 432 may provide a payment card, such as a credit or debit card, to an input interface of one of the client devices 406-424 to initiate a request for funds. The client device 406-424 may read the payment card to obtain transaction information, such as a credit or debit account identifier and an amount associated with the request for funds, and in response, the client device 406-424 may transmit the transaction information upstream to the master gateway 402.

At block 604, the master gateway 402 may determine the transaction type associated with the request for funds. To determine the transaction type, the logic component 504 of the master gateway 402 may execute the transaction type rules software module 524 stored in the memory 502.

More particularly, and as described herein, the request for funds may be associated with an identifier or code, which the logic component 504 may, in association with the transaction type rules software module 524, compare to a list of transaction type codes provided by the transaction type rules software module 524 to determine the transaction type. Where, for example, the code is a gaming code, the logic component 504 may determine that the funds request is associated with a gaming transaction, such as a transaction occurring at a slot machine or table game on a casino property. Similarly, where the code is a retail transaction code, the master gateway 402 may determine that the transaction type associated with the request for funds is a retail transaction.

At block 606, the master gateway 402 may aggregate a plurality of transaction requirements necessary for processing the request for funds based upon the determined transaction type. More particularly, the master gateway 402 may execute one or more software modules 512-520 based upon the determined transaction type. Transaction requirements may include a plurality of regulatory rules requirements, one or more bank rules requirements, a one or more of PCI rules requirements, one or more property rules requirements, one or more vendor rules requirements, one or more problem gaming rules requirements, one or more manufacturer rules requirements, and one or more bank routing requirements.

By way of example and not of limitation, where the logic component 504 determines that the transaction type is gaming, the logic component 504 may further determine that it is necessary to execute the regulatory rules software module 502 to retrieve regulatory rules requirements for processing the gaming transaction. Each of the regulatory rules necessary for processing the funds request may be added to a list or table of transaction requirements for the funds request. Similarly, the logic component 504 may execute the problem gaming rules software module 526, which may add to the aggregated list of transaction requirements a requirement that the user requesting funds is not excluded from game play on the casino property from which the request for funds originates.

In contrast, where the transaction type is retail, the logic component 504 may determine that it is not necessary to execute the regulatory rules software module 502 (because retail transactions are not subject to gaming regulations). Rather, in the instance that the transaction type is retail, the logic component 504 may only execute the bank rules software module 514, the PCI rules software module 516, and the bank routing module 520 to generate the list of transaction requirements necessary for processing the request for funds.

At block 608, the logic component 504 may analyze the transaction data associated with the request for funds and other data associated with the user (such as data stored in the user information records table 526 of the database 506) to populate answers to each requirement in the aggregated list of transaction requirements. For example, at decision diamond 610, the logic component 504 may compare transaction data and user data to each of the transaction requirements to determine whether each of the transaction requirements associated with the request for funds is satisfied. The logic component 504 may further update the list or table of transaction requirements with information indicating whether each of the requirements necessary for processing the request for funds is satisfied.

If all of the transaction requirements are satisfied, at block 612, the logic component 504 may submit the request for funds to one of the plurality of payment processors 426-430. More particularly, the logic component 504 may submit a request for funds to one of the plurality of payment processors 426-430 in response to a determination that the transaction and user data satisfies all of the requirements in the list of transaction requirements. In other words, the logic component 504 may pass the request for funds on to a payment processor 426-430 if the transaction requirements associated with the request for funds are unanimously satisfied.

However, as shown at block 611, where the logic component 504 determines that at least one of the requirements in the list of transaction requirements associated with the request for funds is not satisfied, the logic component 504 may decline the request for funds and may not transmit the request for funds upstream to a payment processor 426-430.

In various embodiments, it is important to vet a request for funds prior to transmittal of the request to a payment processor 426-430, because the payment processor 426-430 may impose a transaction fee on the request for funds even when the payment processor 426-430 declines the request for funds. In other words, the logic component 504 of the master gateway 402 may vet a request for funds prior to the imposition of a transaction processing fee by a payment processor 426-430 to avoid the payment processor fee in the event that a requirement in the list of transaction requirements is not satisfied.

At block 614, the logic component 504 may transmit a transaction response to the client device 406-424 associated with the request for funds. The transaction response may comprise a message indicating that the request for funds has been approved or declined, either by the master gateway 402, or by the selected payment processor 426-430. The transaction response may further include an electronic record operating as an indicia of value, a printed record operating as an indicia of value, a receipt, a voucher, and the like.

In an illustrative embodiment, the logic component 504 may submit a request for funds that has been declined by an initially selected payment processor 426-430 to a secondary payment processor 426-430. The initially selected payment processor 426-430 may be associated with a lowest transaction fee which as determined by the logic component 504 based upon the bank rules software module 514 or the bank routing software module 520. The secondarily selected payment processor 426-430 may be associated with the transaction fee that is greater than the transaction fee associated with the initially selected payment processor 426-430, but which is otherwise available to process the request for funds when the initially selected payment processor has declined to process the request or is otherwise unavailable.

Thus, the logic component 504 may attempt to locate a payment processor 426-430 that will approve the request for funds, even when one or more other payment processors 426-430 have declined the request.

The master gateway 402 may, by way of example and not of limitation, impose a secondary master gateway processing fee on the request for funds. The master gateway 402 may impose this fee prior to submitting the request for funds to a payment processor 426-430 or after submitting to request for funds to a payment processor 426-430. The master gateway 402 may further impose the master gateway fee irrespective of the approval decision of the payment processor 426-430. Thus, the master gateway 402 may collect a transaction fee from a user in response to a request for funds even when a payment processor 426-430 is not selected (e.g., because one or transmitted to a payment processor 426-430), or when one or more selected payment processors 426-430 have declined the request for funds.

The master gateway 402 may further, in response to approval of a request for funds by a payment processor 426-430, generate and transmit an electronic record operating as an indicia of value, a printed record operating as an indicia of value, a receipt, and/or a voucher to an EFT component of the client device from which the request for funds originated, and the client device 406-424 (or the EFT component thereof) may display or print for the user 432 the electronic record, printed record, receipt, and/or voucher for use within the casino. The user 432 may collect the electronic or printed record operating as an indicia of value, the receipt, and/or the voucher, and may submit the record, receipt, or voucher to the cage 434 in exchange for another printed record operating as an indicia of value, such as casino chips, cash, a prepaid casino credit or debit card linked to a player tracking or loyalty account, and the like.

The master gateway 402 may therefore, as described herein, function as an aggregator of transaction requirements and, based upon those requirements, an aggregator of transaction data collected in association with those requirements. In other words, the master gateway 402 may function as a checkpoint or preprocessor through which the request for funds must pass prior to submission, via the master gateway 402, to one or more payment processors 426-430.

This network structure may accommodate a variety of requests for funds, including requests for funds originating from gaming client devices, such as slot machines and table games, located on casino properties. Patrons of casino properties may benefit from the implementation of the master gateway 402 as part of a transaction processing network structure, because the master gateway 402 may permit and enable transaction submission and processing directly from one or more casino client devices such a table games, sports books, keno devices, slot machines, poker tables, bingo games, and the like. In other words, the master gateway 402 may permit the user 432 to continue playing or wagering at a particular casino game without in necessity of retiring from the game in the middle of game play to acquire new or additional funds.

The network structure described with respect to the system 400 may further satisfy the complex web of transactional, regulatory, and security rules governing requests for funds that take place within casinos. Importantly, the system 400 does not operate as a simple mechanism for circumventing these rules (e.g., as an ATM machine located within a casino). Rather, the system 400, as described herein, enables rule determination and compliance in real time and at any client device enabled to receive a transaction instrument, such as a credit or debit card.

The system 400, and more particularly the master gateway 402, may therefore embody an improvement over existing transaction processing systems, particularly over transaction processing systems configured to process gaming transactions, in that the master gateway 402 enables the aggregation and preprocessing of a variety of transaction and user data at the master gateway 402. The master gateway 402 may therefore satisfy a variety of regulatory and transaction processing requirements at a centralized processing hub, which may in turn, reduce the complexity of the transaction processing system and improve the processing or preprocessing speed of the system as a whole. Other advantages include, as described herein, transaction processing at a client device, particularly at the gaming client device within a casino and during game play, real-time protection for individuals associated with a problem gaming status as well as for casinos serving those individuals, transaction fee optimization and real-time payment processor selection, player tracking, and the generation buy-in the master gateway 402.

It is to be understood that the detailed description of illustrative embodiments is provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A gaming gateway system for a networked casino slot machine, the gaming gateway system comprising:
   an embedded controller communicatively coupled to the networked slot machine;
   a smart phone communicatively coupled to the embedded controller, in which a financial transaction request is received by the smart phone;
   a financial gateway communicatively coupled to a financial network and the embedded controller, wherein the financial gateway is configured to receive an authorization request, which is associated with the financial transaction request;
   a gaming regulatory gateway communicatively coupled to the financial gateway and the embedded controller, the gaming regulatory gateway including a regulatory rules module that includes a plurality of regulatory rules and associated gaming limits;
   wherein the gaming regulatory gateway executes the regulatory rules module and retrieves at least one gaming limit associated with the financial transaction request and a gaming property having the networked casino slot machine;
   wherein the gaming regulatory gateway generates the authorization request associated with the financial transaction request for the networked casino slot machine when the financial transaction request is less than the retrieved gaming limit and rejects the financial transaction request when the financial transaction request does not satisfy the retrieved gaming limit; and
   wherein the embedded controller generates an electronic record in response to an approval by the financial network for the financial transaction request.

2. The gaming gateway system of claim 1 wherein the gaming regulatory gateway includes a property rules module having at least one of a transaction amount limit, a daily transaction limit and a limit imposed by a particular patron.

3. The gaming gateway system of claim 1 wherein the gaming regulatory gateway includes at least one of a problem gaming limits rule set, a state rule set, a tribal rule set, a casino property rule set, and a federal gaming rule set.

4. The gaming gateway system of claim 1 further comprising a problem gaming rule set associated with a problem gaming limits module that includes one or more daily limits.

5. The gaming gateway system of claim 4 wherein the problem gaming rule set associated with the problem gaming limits module further includes a pause period during which a transaction cannot be authorized.

6. The gaming gateway system of claim 1 further comprising a list of transaction type codes provided by a transaction type rules software module that determines the transaction type.

7. The gaming gateway system of claim 6 wherein the list of transaction type codes includes a gaming code associated with a gaming transaction that corresponds to the networked casino slot machine.

8. The gaming gateway system of claim 1 further comprising a problem gaming rules software module that requires determining that a user initiating the financial transaction request is not excluded from game play on the gaming property.

9. The gaming gateway system of claim 1 wherein the electronic record is communicated to the smart phone.

10. A gaming gateway system for a networked slot machine, the gaming gateway system comprising:
    an embedded controller communicatively coupled to the networked slot machine;
    a smart phone communicatively coupled to the embedded controller, in which a financial transaction request is received by the smart phone;
    a financial gateway communicatively coupled to a financial network and the embedded controller, wherein the financial gateway is configured to receive an authorization request, which is associated with the financial transaction request;
    a gaming regulatory gateway communicatively coupled to the financial gateway and the embedded controller, the gaming regulatory gateway including a regulatory rules module that includes a plurality of regulatory rules and associated gaming limits;
    wherein the gaming regulatory gateway executes the regulatory rules module and retrieves at least one gaming limit associated with the financial transaction request and a gaming property having the networked casino slot machine;
    wherein the gaming regulatory gateway generates configured to generate the authorization request associated with the financial transaction request for the networked casino slot machine when the financial transaction request is less than the retrieved gaming limit and rejects the financial transaction request when the financial transaction request does not satisfy the retrieved gaming limit;
    a list of transaction type codes provided by a transaction type rules software module that determines the transaction type;
    wherein the list of transaction type codes includes a gaming code associated with a gaming transaction that corresponds to the networked slot machine; and wherein the embedded controller generates an electronic record in response to an approval by the financial network for the financial transaction request.

11. The gaming gateway system of claim 10 wherein the gaming regulatory gateway includes a property rules module having at least one of a transaction amount limit, a daily transaction limit and a limit imposed by a particular patron.

12. The gaming gateway system of claim 10 wherein the gaming regulatory gateway includes at least one of a problem gaming limits rule set, a state rule set, a tribal rule set, a casino property rule set, and a federal gaming rule set.

13. The gaming gateway system of claim 10 further comprising a problem gaming rule set associated with a problem gaming limits module that includes one or more daily limits; and wherein the problem gaming rule set associated with the problem gaming limits module further includes a pause period during which a transaction cannot be authorized.

14. The gaming gateway system of claim 10 wherein the electronic record is communicated to the smart phone.

15. The gaming gateway system of claim 10 further comprising a problem gaming rules software module that requires determining that a user initiating the financial transaction request is not excluded from game play on the gaming property.

16. A gaming gateway system for a networked slot machine, the gaming gateway system comprising:
an embedded controller communicatively coupled to the network slot machine;
a smart phone communicatively coupled to the embedded controller, in which a financial transaction request is received by the smart phone;
a financial gateway communicatively coupled to a financial network and the embedded controller, wherein the financial gateway is configured to receive an authorization request, which is associated with the financial transaction request;
a gaming regulatory gateway communicatively coupled to the financial gateway and the embedded controller, the gaming regulatory gateway including regulatory rules module that includes a plurality of regulatory rules and associated gaming limits;

wherein the gaming regulatory gateway executes the regulatory rules module and retrieves at least one gaming limit associated with the financial transaction request and a gaming property having the networked casino slot machine;
wherein the gaming regulatory gateway generates the authorization request associated with the financial transaction request for the networked casino slot machine when the financial transaction request is less than the retrieved gaming limit and rejects the financial transaction request when the financial transaction request does not satisfy the retrieved gaming limit;
a list of transaction type codes provided by a transaction type rules software module that determines the transaction type;
wherein the list of transaction type codes includes a gaming code associated with a gaming transaction that corresponds to the networked casino slot machine;
wherein the embedded controller generates an electronic record in response to an approval by the financial network for the financial transaction request; and
further comprising a problem gaming rules software module that requires determining that a user initiating the financial transaction request is not excluded from game play on the gaming property.

17. The gaming gateway system of claim 16 wherein the gaming regulatory gateway includes a property rules module having at least one of a transaction amount limit, a daily transaction limit and a limit imposed by a particular patron.

18. The gaming gateway system of claim 16 wherein the gaming regulatory gateway includes at least one of a problem gaming limits rule set, a state rule set, a tribal rule set, a casino property rule set, and a federal gaming rule set.

19. The gaming gateway system of claim 16 further comprising a problem gaming rule set associated with a problem gaming limits module that includes one or more daily limits; and wherein the problem gaming rule set associated with the problem gaming limits module further includes a pause period during which a transaction cannot be authorized.

20. The gaming gateway system of claim 16 wherein the electronic record is communicated to the smart phone.

* * * * *